(No Model.)

R. GALLOWAY.
FERTILIZER DISTRIBUTER.

No. 435,037. Patented Aug. 26, 1890.

Witnesses
E. D. Smith
Alex S. Stewart

Inventor
Robert Galloway,
By his Attorneys
Church & Church

UNITED STATES PATENT OFFICE.

ROBERT GALLOWAY, OF MACEDON, NEW YORK.

FERTILIZER-DISTRIBUTER.

SPECIFICATION forming part of Letters Patent No. 435,037, dated August 26, 1890.

Application filed December 20, 1889. Serial No. 334,403. (No model.)

*To all whom it may concern:*

Be it known that I, ROBERT GALLOWAY, of Macedon, in the county of Wayne and State of New York, have invented certain new and useful Improvements in Fertilizer-Distributers; and I do hereby declare the following to be a full, clear, and exact description of the same, reference being had to the accompanying drawings, forming a part of this specification, and the letters of reference marked thereon.

This invention relates to certain improvements in fertilizer-distributers of that class in which a feed wheel or disk is employed to carry the fertilizer from a hopper to the distributing-channels, and has for its object to improve the general construction and arrangement of the parts, and to provide a carrying-disk having a non-corrodible surface, to which the fertilizer will not adhere, of simple and strong design, easily repaired when broken, and capable of performing its functions should the surface become accidentally destroyed.

The invention primarily consists in providing the feed-wheel with a removable and renewable non-corrodible or smooth surface of glass or similar substance; secondly, in forming the metallic portion or base of the feed-wheel of the proper shape for feeding the fertilizer, and applying the said surface thereto, whereby the distributing may be carried on even should the non-corrodible surface become broken or destroyed.

Finally, the invention consists in certain novel details of construction and combinations and arrangements of parts, to be hereinafter described, and pointed out particularly in the claims at the end of this specification.

Figure 1:
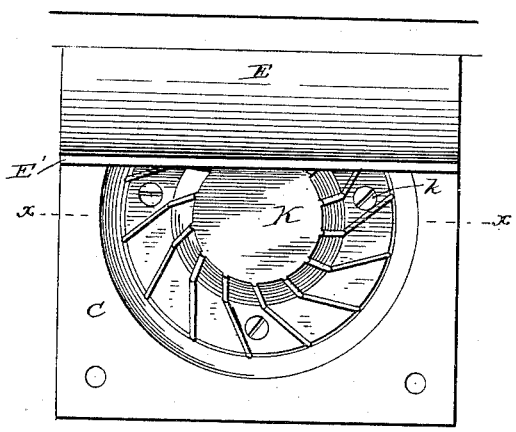
Figure 2:
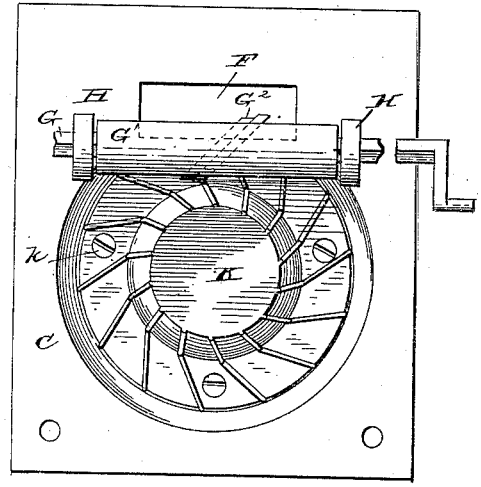
Figure 3:
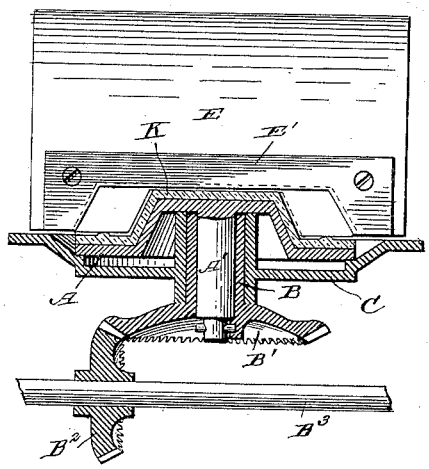
Figure 4:
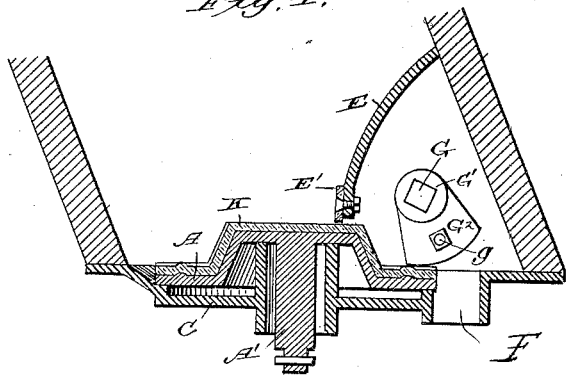
Figure 6:
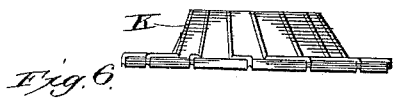
Figure 5:
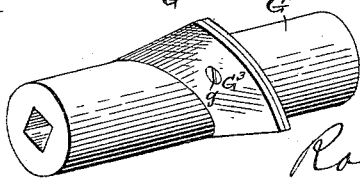
Figure 7:
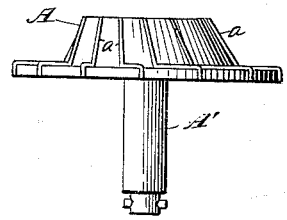

Referring to the accompanying drawings, Figure 1 is a top plan view of a fertilizer-distributer constructed in accordance with my invention, and having but a simple feed wheel or disk. Fig. 2 is a similar view with the cover for the adjustable gate removed. Fig. 3 is a vertical section on the line $x\,x$, Fig. 1. Fig. 4 is a section at right angles to Fig. 3. Fig. 5 is a side elevation of the feed-wheel with the surface-piece in position. Fig. 6 is a similar view with the surface-piece removed. Fig. 7 is a perspective view of the adjustable gate or scraper for removing the fertilizer from the feed-wheel.

Similar letters of reference in the several figures indicate the same parts.

In the preferred form of distributer, which is illustrated in the accompanying drawings, it will be seen that a horizontal metallic feed wheel or disk A is employed, having suitable ribs or projections $a$ on its upper surface to facilitate the feeding operation, which disk is provided on the under side with a downwardly-projecting shaft A', around which fits the sleeve B of the gear-wheel B'. Said gear-wheel and shaft are united by a pin or clutch connection, so as to rotate together, and the sleeve B is journaled in a vertical bearing in the bottom plate C of the hopper, whereby both are supported with the gear-wheel B' in gear with a wheel $B^2$ on the drive-shaft $B^3$, as in the ordinary fertilizer-distributer. Extending out over the feed-wheel is the guard E, leaving spaces or openings at each side of the feed-wheel, through which the fertilizer passes into the distributing-channels F, an adjustable gate or scraper, to be now described, serving to sweep more or less of the fertilizer into said channels. A bar or shaft G, preferably square in cross-section, passes through the hopper behind the guard E, and if there be more than one hopper said shaft passes through all of them in the same manner, being supported in lugs or bearings H, formed on the bottom plate C. Mounted on this shaft and prevented from longitudinal movement by the lugs or bearings H is a hub G', having at one side an inclined blade or gate $G^2$, the outer edge of which lies in proximity to the surface of the feed-wheel, and is adapted, when turned by means of the shaft, to project a greater or less distance over said wheel and thereby scrape off more or less of the fertilizer, as will be readily understood. By means of this simple arrangement of gate and scraper mounted on a horizontal shaft it will be seen that a series of gates may be operated by means of said shaft, and that the number of separate parts and cost are reduced to the minimum.

As is well known, the feed-wheel, adjustable gates, and other operative parts of a fertilizer-distributer are constructed of metal in order to secure the least possible weight with the greatest ease of movement and maximum strength, but difficulty has been experienced by reason of the corrosive and deteriorating effect of the fertilizer on said parts and the increased friction and draft occasioned by the adherence of the fertilizer to the feed-wheels, guards, and gate, causing the same to clog up and become inoperative, as well as increasing the draft. It has been proposed to overcome these difficulties by the employment of feed-wheels constructed entirely of glass, but the frangibility of such material, the extremely rough usage to which this class of machines is exposed, the difficulties and delays incident to the renewal of the feed-wheels when broken, and the inability of the machine to operate without a perfect feed-wheel have prevented them giving entire satisfaction.

I now propose to overcome the difficulties mentioned by providing the feed-wheel with a glass or non-corrodible surface-piece K, which is removably secured in place by cement, screws $k$, or otherwise in such manner as to obtain a firm and rigid support on the metallic portion throughout practically its entire extent, whereby the liability of breaking or becoming injured is reduced to the minimum.

In order to further insure against loss of time incident to the accidental breaking of said surface, I make the metallic portion a perfect feed-wheel, capable of being operated and of feeding the fertilizer successfully when the surface is removed, the under side of the said surface being of course made to conform to the upper surface of the metallic portion, grooves or recesses being formed therein for the reception of the ribs, &c. This adaptation also enables such surface to be put on feed-wheels now in use at small cost and without altering the machine in the least. As a further precaution against the adherence of the fertilizer and corrosion of the parts the guard E is provided with a strip or plate of glass or non-corrodible substance E' at the bottom, where it serves as a cut-off to regulate the amount of fertilizer carried around by the wheel, and the wing or incline scraper $G^2$ is provided with a plate $G^3$ of similar substance held in place by cement or a screw-bolt $g$. The feed-wheel and other surfaces with which the fertilizer comes in contact while in motion it will thus be seen present perfectly smooth surfaces, to which the fertilizer will not adhere or corrode, and should the non-corrodible surfaces become broken or injured the machine may be continued in operation without serious inconvenience, as it will then operate similar to the machines now in use.

Having thus described my invention, what I claim as new is—

1. In a fertilizer-distributer, the combination, with the horizontal feed-wheel and guard, of the adjustable gate or scraper mounted on a horizontal shaft and adapted to be swung horizontally a greater or less distance over the surface of the feed-wheel to remove more or less of the fertilizer, substantially as described.

2. In a fertilizer-distributer, the combination, with the feed-wheel and guard, of the adjustabe gate or scraper consisting of the hub mounted on a rotatable shaft, and the wing or gate projecting at an angle to the hub and moving in proximity to the feed-wheel, substantially as described.

3. In a fertilizer-distributer, the combination, with the feed-wheel and guard, of the adjustable gate or scraper having a removable non-corrodible surface-piece secured thereon, substantially as described.

4. In a fertilizer-distributer, the combination, with the feed-wheel and the guard having a strip of smooth non-corrodible material secured to its lower edge, of the adjustable gate or scraper having a removable non-corrodible surface-piece secured thereon, substantially as described.

5. In a fertilizer-distributer, the combination, with the feed-wheel having a removable and renewable smooth non-corrodible surface-piece thereon, of the guard and gate or scraper having removable and renewable non-corrodible surface-pieces thereon, substantially as described.

6. A metallic feed-wheel for fertilizer-distributers, having a surface-piece of non-corrodible material secured thereon, substantially as described.

7. In combination with a metallic feed-wheel for fertilizer-distributers, having its surface formed to carry the fertilizer, of a surface-piece of non-corrodible substance having its under surface conforming to the shape of the upper surface of the wheel and its upper surface properly formed to carry the fertilizer, substantially as described.

8. In a fertilizer-distributer, the combination, with the metallic feed-wheel having its surface ribbed, of a surface-piece therefor of non-corrodible material having recesses in its under surface for the reception of the ribs, and means for detachably securing said surface-piece in position, substantially as described.

9. As a new article of manufacture, a surface-piece for feed-wheels of fertilizer-distributers, formed of non-corrodible material, substantially as described.

10. As a new article of manufacture, a surface-piece for feed-wheels of fertilizer-distributers, formed of non-corrodible material, with its lower surface conforming to the shape of the feed-wheel, substantially as described.

11. As a new article of manufacture, a surface-piece for feed-wheels, formed of non-corrodible material, with the upper and lower surfaces of the same shape, substantially as described.

12. As a new article of manufacture, a metallic feed-wheel having a glass surface-piece applied thereto, substantially as described.

ROBERT GALLOWAY.

Witnesses:
WELLINGTON SMITH,
CHARLIES ZIMMER.